United States Patent

Ayabe et al.

[11] Patent Number: 6,141,550
[45] Date of Patent: Oct. 31, 2000

[54] SHORT MESSAGE SERVICE

[75] Inventors: Benson S. Ayabe, Naperville; Sharat Subramaniyam Chander, Woodridge, both of Ill.; Semyon B. Mizikovsky, Morganville, N.J.

[73] Assignee: Lucent Technologies Inc., Murray Hill, N.J.

[21] Appl. No.: 09/227,748

[22] Filed: Jan. 8, 1999

Related U.S. Application Data

[62] Division of application No. 08/572,481, Dec. 14, 1995.

[51] Int. Cl.⁷ .............................. H04Q 7/20; H04B 1/38; H04M 1/00
[52] U.S. Cl. ...................... 455/433; 455/466; 455/560
[58] Field of Search .................... 370/16; 455/434, 455/433, 910, 466, 517; 340/870.02

[56] References Cited

U.S. PATENT DOCUMENTS

| | | | |
|---|---|---|---|
| 5,093,824 | 3/1992 | Coan et al. | 370/16 |
| 5,311,516 | 5/1994 | Kuznicki et al. | 370/94.1 |
| 5,313,454 | 5/1994 | Bustini et al. | 370/13 |
| 5,392,398 | 2/1995 | Meyer | 395/200 |
| 5,410,698 | 4/1995 | Danneels et al. | 395/650 |
| 5,502,721 | 3/1996 | Pohjakallio | 370/60.1 |
| 5,508,732 | 4/1996 | Bottomley | 348/7 |
| 5,557,724 | 9/1996 | Sampat et al. | 395/157 |
| 5,594,740 | 1/1997 | Ladue . | |
| 5,603,084 | 2/1997 | Henry, Jr. | 455/33.1 |
| 5,666,348 | 9/1997 | Thornberg et al. | 370/230 |
| 5,742,588 | 4/1998 | Thornberg et al. | 370/236 |
| 5,778,316 | 7/1998 | Persson et al. | 455/434 |
| 5,905,954 | 5/1999 | Nguyen | 455/433 |
| 5,920,822 | 7/1999 | Houde et al. | 455/466 |
| 5,946,629 | 8/1999 | Sawyer et al. | 455/466 |
| 5,946,630 | 8/1999 | Willars et al. | 455/466 |
| 5,978,685 | 11/1999 | Laiho | 455/466 |
| 5,987,323 | 11/1999 | Houtari | 455/433 |
| 5,999,825 | 12/1999 | Geulen | 455/560 |

*Primary Examiner*—William Cumming
*Attorney, Agent, or Firm*—Jason DeMont; Irena Lager

[57] ABSTRACT

A system (100) that is capable of transmitting a displayable message to a short message entity (102, 104 or 105) in more than one data package over a conveying network. The system (100) uses a capacity determiner (206) to determine a capacity of the conveying network for transmitting data. Based on this capacity of the conveying network, a fragmenter (204) divides the displayable message into fragments at an application protocol layer. The size of a fragment does not exceed the capacity of the conveying network. Finally, a packager (208) packages the fragments into data packages. The data packages are operable to be separately transmitted by a short message service over the conveying network. The data packages may include a reference parameter corresponding to the position of the fragment in the displayable message. Further, a reference parameter may indicate the total size of the displayable message being fragmented and packaged. When all of the fragments of the displayable message are received at the terminating short message entity (102, 104 or 105), a fragment retriever (304) retrieves the fragments. A message reconstructer (306) reconstructs the displayable message. The displayable message is then passed to a disposing device (308).

1 Claim, 3 Drawing Sheets

SHORT MESSAGE SERVICE

This is a divisional of application Ser. No. 08/572,481, filed on Dec. 14, 1995.

FIELD OF THE INVENTION

The present invention relates to telecommunications systems in general and, more particularly, to a system and method for transmitting a displayable message between short message entities.

BACKGROUND OF THE INVENTION

Some telecommunications service providers, including cellular and paging companies, provide a "short message service" which allows a user to send and receive displayable messages via a "short message entity." For purposes of this specification, a short message entity is a device that is capable of composing or disposing of short messages. Both wireline and wireless terminals, including cellular telephones and pagers, may function as short message entities. Further, short message service includes the capability of conveying a short message from an originating short message entity to one or more terminating short message entities. For example, current paging systems can transmit a displayable message that consists of a telephone number to be called. Some wireless systems can also send alphanumeric text for display on the screen of a wireless terminal thus allowing users to send more detailed messages. Alphanumeric text can also be sent to computing devices such as desk and lap-top computers over wireless or wired terminals or devices. Unfortunately, current short message services can only handle displayable messages of limited size. However, to compete with the burgeoning electronic mail industry, telecommunications service providers would like to be able to transmit longer "short" messages to terminating short message entities.

The Telecommunications Industry Association ("TIA") has prescribed interim standards (designated "IS" concatenated with an identifier) for transmitting displayable messages to short message entities over various wireless air interfaces and networks. Each interim standard specifies a protocol including operations, parameters, operational messages and procedures for transmitting a displayable message as a single data package. For example, IS95A and IS-637 specify protocols for wireless systems that use Code Division Multiple Access ("CDMA") technology. Further, the IS-136 family of standards specify protocols for short message service in Time Division Multiple Access ("TDMA") systems. The IS-91 family of standards specifies protocols for short message service in advanced mobile phone service ("AMPS/NAMPS") systems. Finally, IS-41-C specifies protocols for short message service over inter-system networks. Analogous protocols exist in the paging industry. Unfortunately, each of these standards specifies a maximum length for the displayable message. The standards do not contemplate transmission of longer displayable messages.

Typically, an originating short message entity generates a displayable message for transmission to a terminating short message entity. The displayable message is transmitted over a "conveying network" or "pipeline" between these short message entities. The conveying network includes the network elements and air interface traversed by the displayable message. The conveying network may include some signaling mechanism such as, for example, Signaling System 7 ("SS7"), X.25, Internet Protocol ("IP"), Asynchronous Transfer Mode ("ATM"), or Frame Relay. Further, the air interface may be digital such as TDMA, CDMA or other digital air interface. Alternatively, the air interface may comprise an analog interface. It is noted that the originating and terminating short message entities do all of the processing with the short message service at the application protocol layer. The intervening conveying network simply acts as a conduit for information between these two end points. Unfortunately, the conveying network can only transmit up to a maximum amount of data or information as a single data package due to, for example, operational standards as described above or specific implementation of portions of the conveying network. The capacity of the conveying network thus limits the size of displayable message that can be transmitted in a data package.

Developers in the paging industry have dabbled with systems that divide a displayable message into multiple fragments for transmission. However, such systems are primitive because there is no method to handle fragments that are received out of order, or to provide for retransmissions to make up for lost fragments. Further, fragmentation of operational messages has been used in lower layer operations in wireless networks. However, to adapt this capability for use in transmitting displayable messages, wireless service providers would have to install numerous software and hardware upgrades to existing networks—an expesive task.

SUMMARY OF THE INVENTION

An illustrative embodiment of the present invention provides a system that is capable of transmitting a displayable message to a terminating short message entity in more than one data package over a conveying network. A capacity determiner ascertains the capacity of the conveying network for transmitting data. Based on the capacity of the conveying network, a fragmenter divides the displayable message into fragments at an application protocol layer. The size of a fragment does not exceed the capacity of the conveying network. Finally, a packager packages the fragments into data packages. The data packages are separately transmitted using a currently defined short message service over the conveying network.

Advantageously, in the illustrative embodiment, each data package may include a reference parameter corresponding to the position of the fragment in the displayable message, and a reference parameter indicating the total size of the displayable message being fragmented and packaged. Other reference parameters may be included in the data packages such as a parameter that indicates the identity of the displayable message to which the fragment corresponds.

Another illustrative embodiment of the present invention provides a system capable of reconstructing a displayable message from multiple data packages transmitted over a conveying network. The system includes a fragment retriever that obtains from the data package a fragment of a displayable message. The size of the fragments is based on the capacity of the conveying network to transmit data. In one embodiment, the fragment retriever further obtains from the data package a reference parameter that indicates the relative position of the fragment in the displayable message. The fragment retriever further orders the corresponding fragments according to the reference parameters obtained from the data packages. Once all fragments have been received, determined by comparing the cummulative size of fragments received against the total size parameter, a message reconstructer assembles the fragments into the displayable message.

BRIEF DESCRIPTION OF THE DRAWINGS

Illustrative embodiments of the present invention are described below in conjunction with the accompanying drawings, in which.

DETAILED DESCRIPTION

Figure 1:
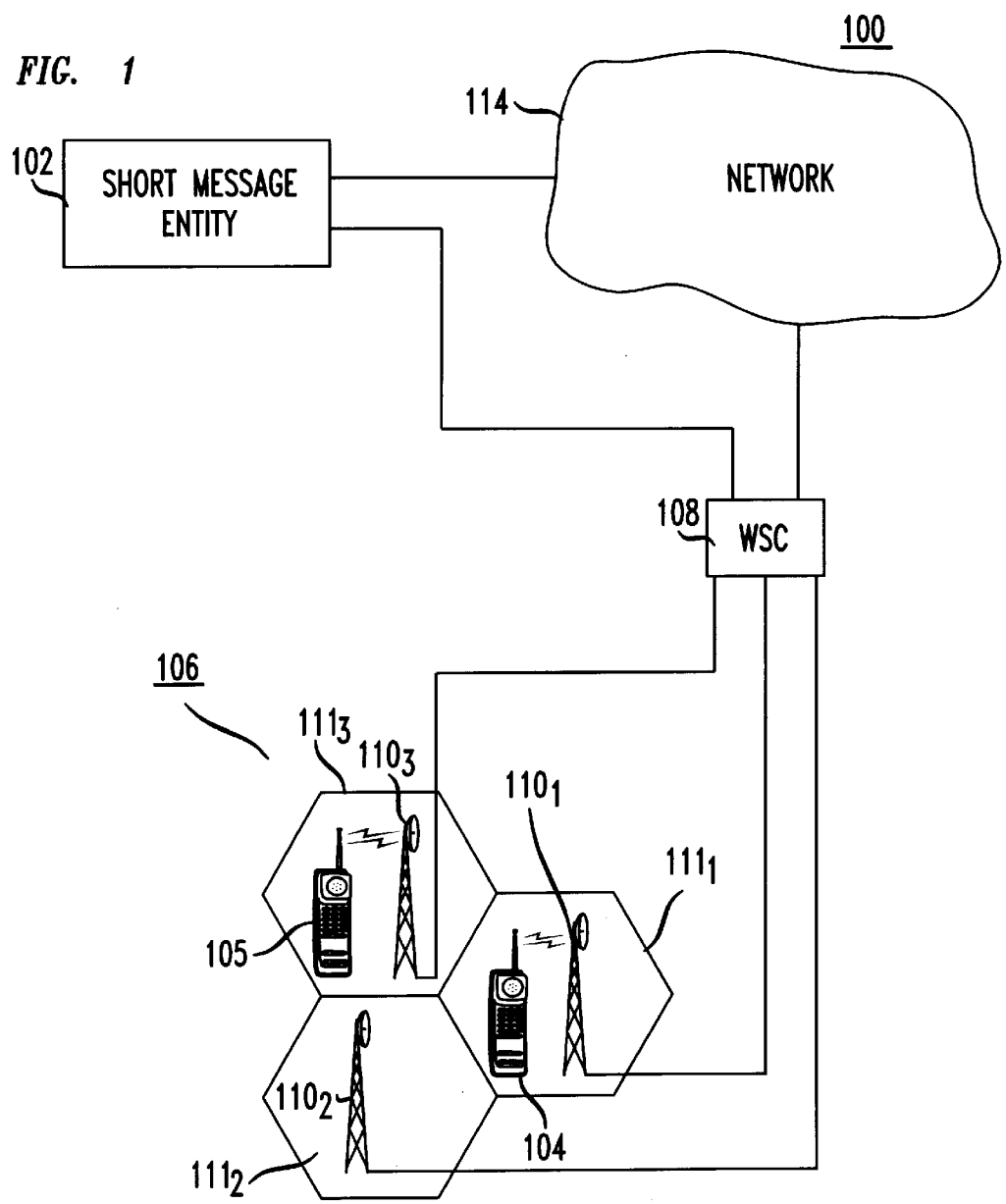
FIG. 1 is a block diagram of an illustrative embodiment of the present invention that provides a system for transmitting a displayable message over a conveying network.

FIG. 1 is a block diagram of an illustrative embodiment of the present invention. Telecommunications system 100 transmits displayable messages between, for example, short message entities 102, 104 and 105 over a conveying network in more than one data package using a short message service. As shown in FIG. 1, a short message entity may reside in a wireless terminal (e.g., short message entities 104 and 105 which may comprise cellular or mobile telephones, or a pager), a wireline terminal (e.g., short message entity 102 which may comprise a wireline telephone, facsimile machine or computer) or other appropriate terminal for transmitting displayable messages.

Telecommunications system 100 includes serving wireless system 106. Wireless system 106 includes wireless switching center ("WSC") 108 that routes displayable messages through base stations $110_1$, $110_2$ and $110_3$ to and from wireless terminals such as short message entities 104 and 105. Each base station $110_n$ services a region $111_n$ referred to as a "cell." For simplicity, each cell $111_n$ is depicted as a hexagon. However, the actual shape of a cell $111_n$ is dictated by factors such as the terrain and electromagnetic sources. It is noted that each cell $111_n$ may be further divided into a two or more sectors. Each base station $110_n$ includes antennas and radios for communicating with wireless terminals. Each base station $110_n$ further includes transmission equipment for communicating with wireless switching center 108.

Short message entity 102 is coupled to wireless switching center 108 through at least two types of paths. First, network 114 couples short message entity 102 to wireless switching center 108 through an "indirect" path. Network 114 may comprise, for example, a network employing SS7, X.25, IP, ATM or frame relay technology. Further, short message entity 102 may be coupled to wireless switching center 108 through a direct path.

In operation, short message entities can transmit displayable messages over telecommunications system 100 in at least two ways. First, short message entities can transmit displayable messages directly to a terminating short message entity over telecommunications system 100. Further, short message entities can transmit displayable messages to an intermediate node, such as a message center, in network 114 for storage until such time as the terminating short message entity is ready to receive the displayable message. This is referred to as "store and forward" transmission of a displayable message.

In direct transmission, short message entity 102, for example, generates a displayable message for transmission to short message entity 104. The displayable message may comprise alpha-numeric characters transmitted as formatted (octets) or unformatted binary bits. The conveying network or pipeline between short message entity 102 and short message entity 104 comprises network 114, wireless switching center 108 and bases station $110_1$ As described above, the maximum amount of data or information (e.g., formatted or unformatted binary bits) that can be transmitted through the conveying network as a single package of data is defined as the "capacity" of the conveying network. Short message entity 102 determines the capacity of the conveying network that is to be used to transmit the displayable message to short message entity 104. Based on this capacity, short message entity 102 divides the displayable message into fragments that are less in size than that capacity and packages these fragments for transmission over the conveying network.

Short message entity 104 receives the packages from base station $110_1$ and reconstructs the displayable message. Short message entity 104 then displays the displayable message on, for example, a screen. Thus, system 100 can transmit a displayable message to short message entity 104 that exceeds the capacity of the conveying network and the short message service used to transmit the displayable message. The fragmentation and reconstruction of the displayable message can be carried out at the teleservice (application) protocol layer, thus not requiring an expensive modification to components of network 114 or wireless network 106.

Alternatively, telecommunications system 100 can also support store and forward transmission of a displayable message. For example, short message entity 105 can transmit a displayable message to short message entity 104. Short message entity 105 generates a displayable message for transmission to short message entity 104. If short message entity 104 is not available, telecommunications system 100 identifies a message center in network 114 or wireless switching center 108 to receive and store the displayable message. Short message entity 105 determines the capacity of the conveying network that is to be used to transmit the displayable message to the message center. Based on this capacity, short message entity 105 divides the displayable message into fragments that are less than that capacity and packages these fragments for transmission over the conveying network to the message center.

When short message entity 104 is available to receive the message, the message center determines the capacity of a conveying network to be used to carry the displayable message to short message entity 104. Short message entity 104 receives the packages from base station $110_1$ and reconstructs the displayable message. Short message entity 104 then displays the displayable message on, for example, a screen. It is noted that in both direct and store and forward techniques, network 114 may include nodes that perform the functions of short message entities 102, 104 and 105. For example, these functions may be performed in a message center, a home location register, a wireless switching center or other appropriate network node.

It is noted that short message entities 104 and 105 are both shown for convenience in wireless system 106. It is understood that short message entities 104 and 105 may communicate displayable messages over telecommunications system 100 even when short message entities 104 and 105 are not located in the same wireless system or are not using the same wireless switching center.

EXAMPLE

In a cellular system using SS7 as the inter-system carriage protocol, the message package capacity is limited to 272 octets. A short message delivery operation, designated "SMDPP," can therefore carry only 272 octets of information. A considerable portion of this is used for "overhead" information, such as addressing and other parameters, some that are mandatory and some that are optional. The size of this overhead governs how much will remain to carry the displayable message in the data package. In an SS7 network, the component of the SMDPP operation that transmits the displayable message is referred to as "bearer data".

In a typical implementation, the overhead information may require 92 octets, leaving 180 octets available for transmitting the displayable message as bearer data. According to the illustrative embodiment, for displayable messages that exceed 180 octets, the composite displayable message is broken into fragments of 180 octets or less and transmitted with separate SMDPP operations.

If a serving wireless switching center ("WSC") could only handle 100 octets, then the size of the fragments is further limited. Considering the 100 octet pipe capacity imposed by the serving WSC, at least three SMDPP operations would be needed to carry a displayable message with between 200 and 300 octets of data. Each SMDPP operation can carry different amounts of data so long as no SMDPP operation exceeds the 100 octet pipe capacity defined by the WSC. Alternatively, all but one SMDPP operation can carry the data equal to the capacity while the last SMDPP operation carries data that is less than the capacity.

If any one of the fragments does not arrive at the terminating short message entity, the resulting automatic negative acknowledgement that already exists as part of the existing standards for single data package short message service would instigate the originating short message entity to retransmit that particular fragment. The integrity of each short message service delivery would also be guaranteed by lower layer checks (e.g., CRC, etc).

Figure 2:
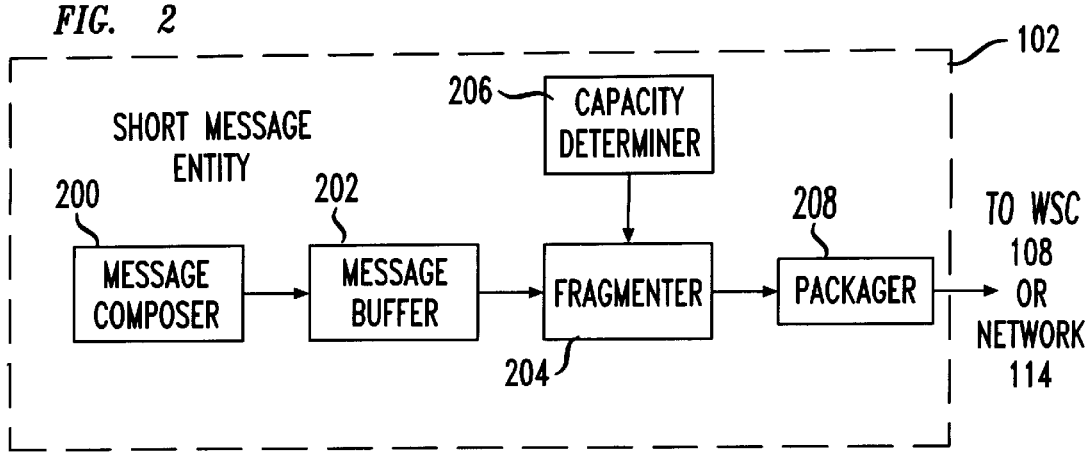
FIG. 2 is a block diagram of an illustrative embodiment of a portion of a short message entity for use in composing a displayable message for transmission in the system of FIG. 1.
Figure 3:
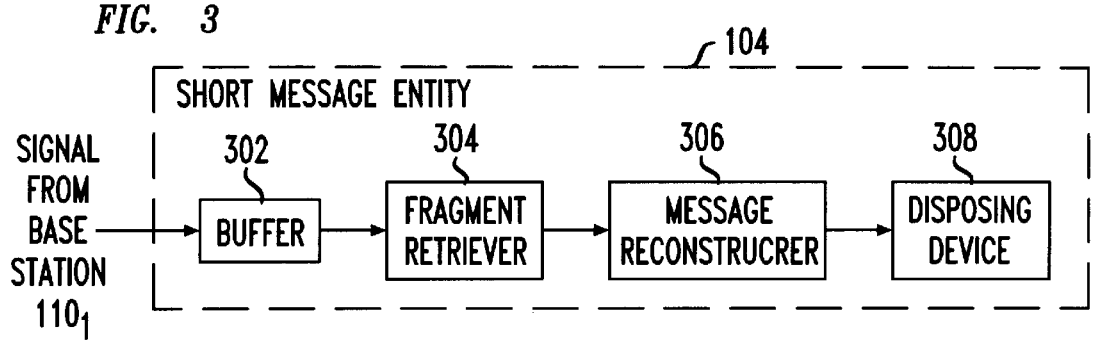
FIG. 3 is a block diagram of an illustrative embodiment of a portion of a short message entity for use in reconstructing a displayable message with the system of FIG. 1.

For clarity, FIGS. 2 and 3, described below, only show circuitry for transmitting a displayable message in one direction. Thus FIG. 2 illustrates circuitry that is used to compose a displayable message for transmission. Similarly, FIG. 3 illustrates circuitry that is used to reconstruct a displayable message. It should be understood that short message entity 102 may include circuitry similar to FIG. 3 and that short message entity 104 may comprise circuitry similar to FIG. 2. Further, for purposes of this specification, a short message entity that is used to compose a displayable message is referred to as an "originating short message entity." Similarly, a short message entity that is used to reconstruct a displayable message is referred to as a "terminating short message entity."

FIG. 2 is a block diagram of an embodiment of an originating short message entity for use in telecommunications network 100 of FIG. 1. Originating short message entity 102 processes displayable messages for transmission to a terminating short message entity. Originating short message entity 102 includes message composer 200. Message composer 200 provides displayable messages to message buffer 202. Message buffer 202 and capacity determiner provide inputs to fragmenter 204. Fragmenter 204 provides an output to packager 208.

In operation, originating short message entity 102 divides a displayable message entered with message composer 200 into fragments for transmission over a conveying network to a terminating short message entity. Capacity determination operation 206 determines the capacity for the virtual. As described in more detail below with respect to FIG. 5, capacity determiner 206 may determine the capacity of the conveying network in part based on a value of a parameter that is included in an autonomous registration process for a wireless terminal that roams into a region covered by wireless switching center 108. Originating short message entity 102 may use data on limitations of other aspects of the conveying network to set the size of the fragments. Fragmentation operation 204 divides the displayable message into fragments such that the fragments do not exceed the capacity of the conveying network. By thus dynamically sizing the data packages, the illustrative embodiment of the present invention advantageously allows displayable messages to be sent with increased usage of network resources. Packaging operation 208 places the fragments in data packages for transmission.

In addition to the fragments, the data packages may include other reference parameters. For example, the data packages may include a parameter, e.g., SMS_Fragment_Number, indicating the position of each fragment within the displayable message. Additionally, the data packages may each include an indicia of the size of the displayable message, e.g., SMS_Total_Payload_Size. Finally, each data package may include a parameter, e.g., Msg_ID, that identifies the displayable message to which the data package belongs. It is noted that the capacity, as defined previously, is the size of the largest data package that the virtual circuit can transmit. Thus, the capacity of the circuit includes space for "overhead" information used in transmitting data that is included with each package of data. This overhead may include, for example, the short message service protocol as well as the parameters SMS_Fragment_Number, SMS_Total_Payload_Size, and Msg_ID.

While fragmenter 204 may use a parameter corresponding to the relative position of the fragment, the sequence of the fragments may be preserved in other ways. Fragmenter 204 may, for example, pass each fragment to packager 208 and await the corresponding automatic acknowledgment before operating on the next fragment thereby passing the fragments to the packager in the order corresponding to the displayable message.

As previously noted, the conveying network between short message entity 102 and short message entity 104 merely transmits each data package according to existing protocols. No processing of the contents of the data packages occurs in the conveying network thus allowing implementation without requiring significant modifications to software or hardware or both.

FIG. 3 is a block diagram of a portion of a terminating short message entity for use in telecommunications system 100 of FIG. 1. Terminating short message entity 104 includes buffer 302. Buffer 302 provides an input to fragment retriever 304. Fragment retriever 304 provides an input to message reconstructer 306. Finally, message reconstructer 306 drives disposing device 308 which may, for example, comprise a display for displaying a displayable message to a user.

In operation, buffer 302 receives more than one data package relating to a displayable message transmitted from originating short message entity 102 to terminating short message entity 104. Buffer 302 stores the data packages. Fragment retriever 304 retrieves a fragment of a displayable message and a reference parameter from each data package that indicates the position of the fragment relative to the other fragments in the displayable message. Fragment retriever 304 further orders the fragments according to the reference parameters retrieved from the data packages. Message reconstructer 306 reconstructs the displayable message and provides the displayable message to disposing device 308. It is noted that fragment retriever 304 may process data packages corresponding to different displayable messages in parallel if a parameter such as Msg_ID is used.

Figure 4A:
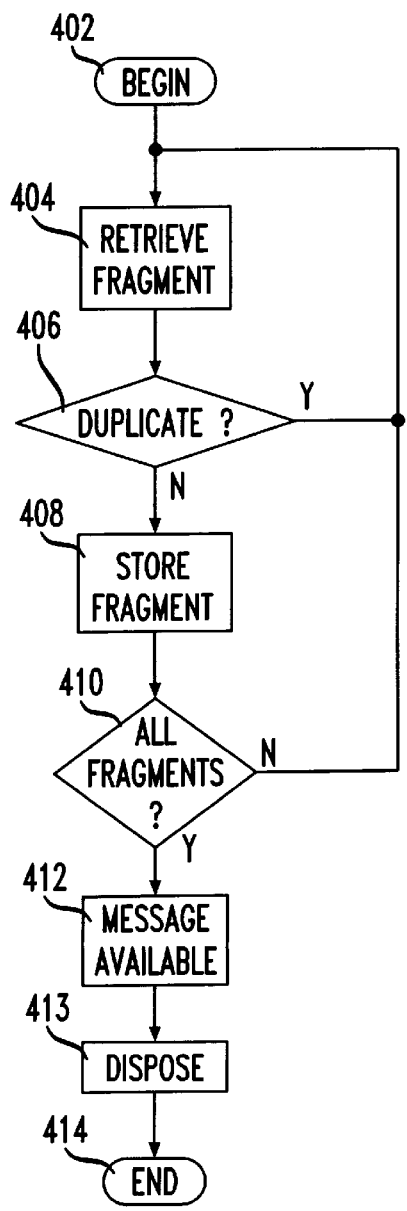
FIGS. 4a–4b are flow charts that illustrate embodiments of the present invention for reconstructing a displayable message transmitted in more than one data package over a conveying network.

FIG. 4a is a flow chart illustrating an embodiment of the present invention. The method begins at block 402. At block 404 the method retrieves a data package. At block 406, the method determines whether the data package has already been received by, for example, checking the SMS_Fragment_Number and the Msg_ID parameters against a list of received data packages. If the answer is yes, the data package has been previously received and the method returns to block 404 to retrieve another data package. Thus, terminating short message entity 104 can reject duplicate fragments that may have been received due to retransmissions. A retransmission by the originating short message entity may occur, for example, because an acknowledgment to an earlier transmission was not received in time, e.g., prior to expiration of a timer at the originating short message entity.

If, however, the answer at block 406 is no, then the data package has not been previously received. At block 408, the fragment is retrieved from the data package and stored. Receipt of the fragment may be recorded by, for example, recording the parameters SMS_Fragment_Number and Msg_ID for the data package.

At block 410, the method determines whether all fragments corresponding to the displayable message have been retrieved. The parameter SMS_Total_Payload_Size included in at least one data package may be used in determining whether all fragments have been retrieved. If not all fragments have been retrieved, the method returns to block 404 and continues to receive data packages. If, however, the answer is yes, the method proceeds to block 412 and marks the displayable message ready for reassembly. At block 413, the method disposes of the displayable message by, for example, displaying the displayable message. The method ends at block 414.

Figure 4B:
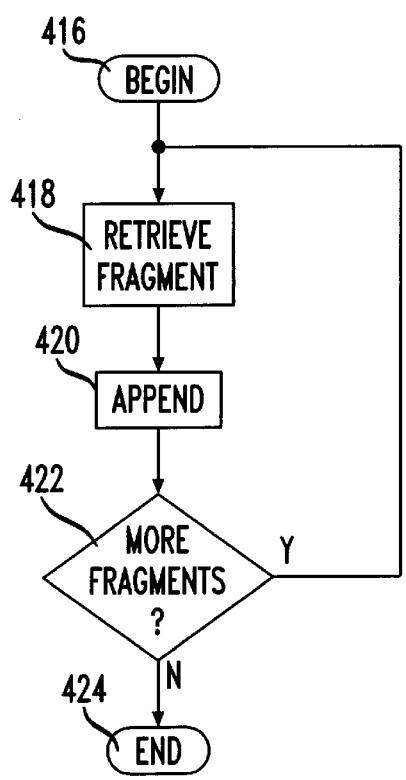

FIG. 4b is a flow chart of an illustrative embodiment of the present invention. The method begins at block 416. At block 418, the method retrieves a fragment from a data package. At block 420, the method appends the fragment to the end of the displayable message undergoing re-assembly. The method determines whether there are other fragments to be appended to the displayable message at block 422. This determination may be based on whether the number of characters in the re-assembled message is equal to the value of a parameter such as SMS_Total_Payload_Size. If the answer is yes, then the method returns to block 418 and retrieves and processes the next fragment. When the answer at block 422 is no, then the entire displayable message has been re-assembled, and the method ends at block 424.

Figure 5:
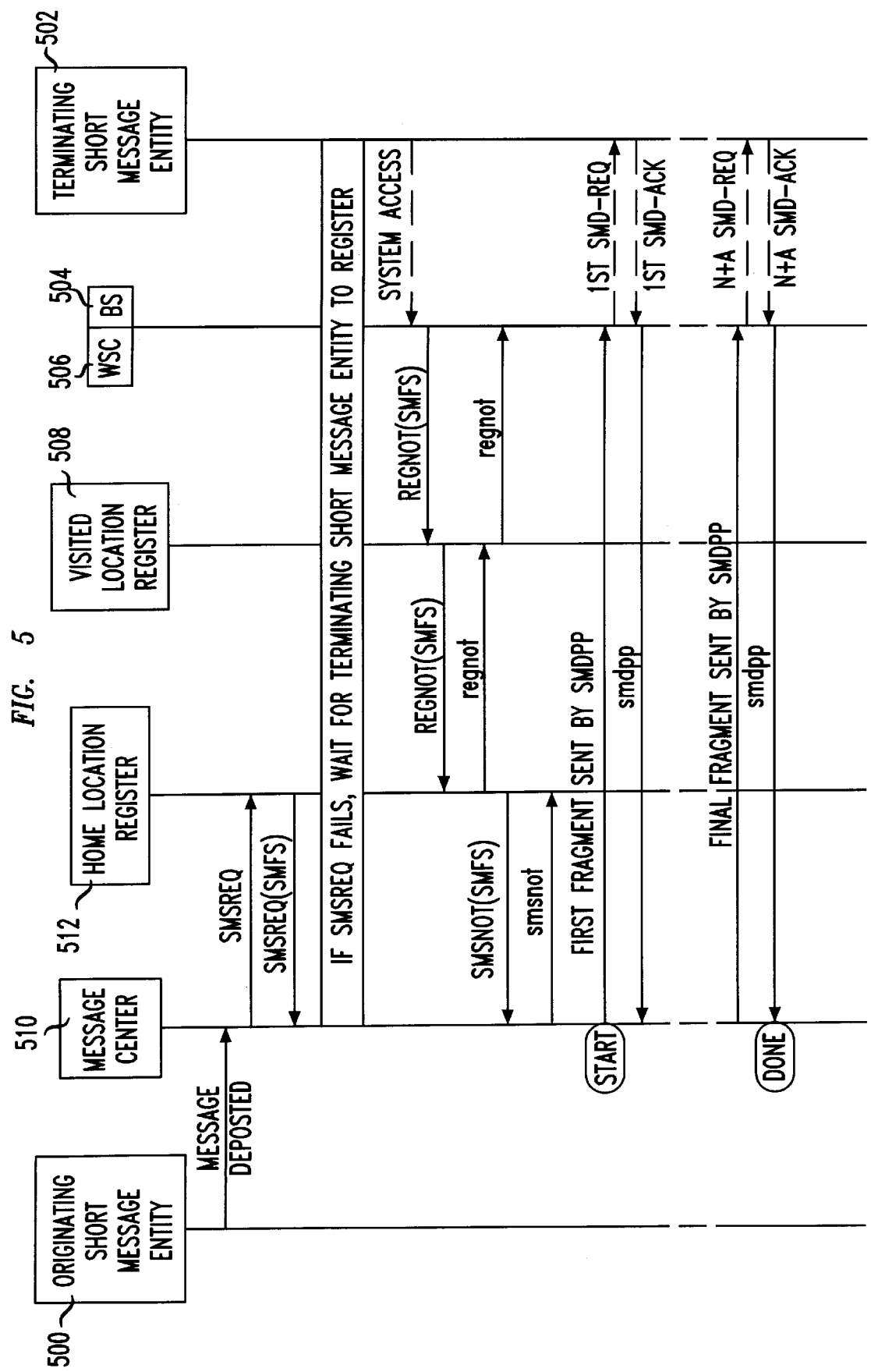
FIG. 5 is a sample operational message flow scenario of an illustrative embodiment of the present invention.

FIG. 5 is a sample operational message flow scenario of an illustrative embodiment of the present invention. Originating short message entity 500 sends a displayable message to terminating short message entity 502. For illustrative purposes, terminating short message entity 502 comprises a wireless terminal such as a cellular telephone or pager. Terminating short message entity 502 is capable of communicating with a serving base station 504 over a prescribed air interface such as TDMA, CDMA, AMPS/NAMPS or other standard that supports short message service. Base station 504 is coupled to wireless switching center ("WSC") 506. Visited location register 508 is associated with wireless switching center 506 and contains a listing of wireless terminals that are in the area covered by wireless switching center 506. Message center 510 and home location register 512 are associated with the home wireless telecommunications network of terminating short message entity 502. It is noted that message center 510 and originating short message entity 500 my reside in a single device such as a personal computer, a wireless or wireline terminal or other device for sending a short message.

In operation, originating short message entity 500 deposits a displayable message with message center 510. Message center 510 sends a Short Message Service Request (SMSREQ) invoke to home location register 512. If terminating short message entity 502 is being served by its home wireless telecommunications system or a visited wireless telecommunications system with which terminating short message entity 502 has previously registered (e.g., by autonomous registration), then home location register 512 sends a short message service request (smsreq) return result, including, among other things, a parameter SMS_Maximum_Fragment_Size (SMFS), giving the capacity of wireless switching center 506 and base station 504.

If, however, terminating short message entity 502 has roamed into a wireless telecommunications system and has not registered, then the smsreq from home location register 512 will indicate a failure. Message center 510 stores the displayable message until terminating short message entity 502 accesses serving wireless switching center 506, and REGNOT and SMSNOT operations are performed.

As shown in FIG. 5, to register in the visited system, terminating short message entity 502 performs a "system access", which may include, among other things, placing a call in the serving system through base station 504 and wireless switching center 506. Wireless switching center 506 sends a "RegistrationNotification" message (REGNOT) to visited location register 508. Visited location register 508 in turn transmits the REGNOT message to home location register 512. Wireless switching center 506 includes a parameter SMFS that gives the capacity of wireless switching center 506 and base station 504 in the REGNOT message if wireless switching center 506 is capable of performing short message service. The capacity typically depends on the internal design of wireless switching center 506 or base station 504 or other components of the conveying network. Home location register 512 transmits the SMFS parameter to message center 510 in the SMS Notification (SMSNOT) invoke. Message center 510 uses the SMFS parameter to divide the displayable message into appropriately sized fragments for transmission over the conveying network via, for example an SMDPP operation. As also shown in FIG. 5, message center 510 sends and SMS notification (smsnot) return result to home location register 512. Home location register 512 in turn sends a RegistrationNotification (regnot) return result to the visited location register 508. Visited location register 508 in turn sends a regnot return result message to wireless switching center 506.

Once message center 510 has received either the smsreq message or the SMSNOT message, message center 510 may fragment the displayable message according to the pipe capacity given in the SMFS parameter. If the capacity of the portion of the conveying network of the home wireless telecommunications system is smaller than the portion of pipeline of wireless switching center 506 and base station 508, as given in the SMFS, then the SMFS will be adjusted at home location register 512.

Message center 510 transmits the fragments to wireless switching center 506 and base station 504 using, for example, the short message delivery operation (SMDPP). Base station 504 transmits the fragments to terminating short message entity 502 in a message labeled, for example, first Short Message Delivery Request (1st SMD-REQ). Terminating short message entity 502 acknowledges receipt in a first Short Message Delivery Acknowledgment (1st SMD-ACK) message to base station 504. An smdpp return result for the first SMDPP operation is transmitted from wireless switching center 506 to message center 510. Message center 510 similarly sends each fragment to terminating short message entity 502. As shown, when the Nth, or final fragment has been transmitted by message center 510 and received by terminating short message entity 502, transmission is complete. The fragmentation and transmission process ends. Terminating short message entity 502 then reconstructs the displayable message from the fragments as described above. It is noted that operational messages such as SMSREQ and REGNOT exist in some form in current standards such as IS-41 thus making the illustrative embodiments more easily implemented. Further, other operational messages may be used to accomplish the result as described above.

It should be understood that the operative elements of the system architecture relevant to the invention are highlighted above. Many others, while present in the architecture, are only tangentially relevant to the present invention, so they are either not referred to or grouped with other elements in a broader description of their function at the system level. Further, the present invention involves systems that process and transmit data, where many operations may be done in a different order or using a different methodology to achieve the same end result. For example, re-assembly of the displayable message may be done concurrently with the fragment retriever by simply concatenating the fragments as they are received and shifting previously received data and inserting any fragments received out of order. Further, the capacity determination may take into account more than just the capacity of the serving wireless switching center. The capacity of each element of the conveying network may be considered in determining the size of the fragments. Further, the teachings of the present invention are also applicable to terminating short message entities that are in the process of being handed off or are in sleep mode. Finally, the illustrative systems discussed in conjunction with the Figures relate to cellular wireless systems, but the concepts also apply to wireline and other wireless systems, such as paging systems.

What is claimed is:

1. A wireless telecommunication system that is capable of registering visiting wireless terminals associated with a different home location register, the system comprising:

a wireless switching center that is operable to receive calls and registration information from visiting wireless terminals through one of a plurality of base stations;

a visited location register coupled to the wireless switching center, the visited location register is operable to relay an indicia of the capacity of the wireless system during a registration operation to the home location register of the wireless terminal for use in fragmentation and reassembly of displayable messages transmitted on a short message service when the displayable message exceeds the capacity of the system;

the capacity of the wireless system being the amount of data that can be transmitted through the conveying network as a single package of data.

* * * * *